United States Patent
Wang et al.

(10) Patent No.: US 9,117,413 B2
(45) Date of Patent: Aug. 25, 2015

(54) TOUCH PANEL AND TOUCH DISPLAY DEVICE

(71) Applicant: Wintek Corporation, Taichung (TW)

(72) Inventors: Wen-Chun Wang, Taichung (TW); Ming-Sin Jian, Tai Chung County (TW)

(73) Assignee: Wintek Corporation, Taichung (TW)

( * ) Notice: Subject to any disclaimer, the term of this patent is extended or adjusted under 35 U.S.C. 154(b) by 24 days.

(21) Appl. No.: 14/109,031

(22) Filed: Dec. 17, 2013

(65) Prior Publication Data

US 2014/0104514 A1 Apr. 17, 2014

Related U.S. Application Data

(63) Continuation of application No. 12/981,637, filed on Dec. 30, 2010, now Pat. No. 8,638,399.

(30) Foreign Application Priority Data

Jan. 8, 2010 (TW) ................................ 99100381 A (51) Int. Cl.
| | |
|---|---|
| G02F 1/1362 | (2006.01) |
| G09G 3/36 | (2006.01) |
| G06F 3/041 | (2006.01) |
| G06F 3/044 | (2006.01) |
| G02F 1/1333 | (2006.01) |
| G02F 1/1335 | (2006.01) |

(52) U.S. Cl.
CPC .............. *G09G 3/36* (2013.01); *G02F 1/13338* (2013.01); *G02F 1/136204* (2013.01); *G06F 3/044* (2013.01); *G06F 3/0412* (2013.01); *G06F 3/0416* (2013.01); *G02F 1/133514* (2013.01); *G02F 2001/133334* (2013.01); *G06F 2203/04107* (2013.01); *G06F 2203/04111* (2013.01)

(58) Field of Classification Search
CPC . G02F 1/1338; G02F 1/13338; G06F 3/0488; G06F 3/044
USPC ............................................ 349/12; 345/174
See application file for complete search history.

(56) References Cited

U.S. PATENT DOCUMENTS

| | | | |
|---|---|---|---|
| 2009/0194344 A1 | 8/2009 | Harley et al. | |
| 2009/0236151 A1* | 9/2009 | Yeh et al. | 178/18.03 |
| 2010/0128000 A1* | 5/2010 | Lo et al. | 345/174 |
| 2011/0012841 A1 | 1/2011 | Lin | |

FOREIGN PATENT DOCUMENTS

| | | |
|---|---|---|
| JP | 2009-086184 A | 4/2009 |
| TW | 200819877 A | 5/2008 |
| TW | M34454 U | 11/2008 |

OTHER PUBLICATIONS

Chinese Office Action dated Dec. 31, 2011, as issued in corresponding Chinese Patent Application No. 201010000723.3.

* cited by examiner

*Primary Examiner* — Thanh-Nhan P Nguyen
(74) *Attorney, Agent, or Firm* — Muncy, Geissler, Olds & Lowe, P.C.

(57) ABSTRACT

A touch display device including a display, a touch panel and a transparent shielding layer is provided. The touch panel is disposed on the display, and includes a substrate and touch sensors positioned thereon. The transparent shielding layer is set between the display and the touch sensors of the touch panel, and includes an edge region and a central region wherein the impedance of the edge region is less than or equal to that of the central region.

51 Claims, 5 Drawing Sheets

TOUCH PANEL AND TOUCH DISPLAY DEVICE

CROSS-REFERENCE TO RELATED APPLICATIONS

This application is a continuation of application Ser. No. 12/981,637, filed on Dec. 30, 2010.

BACKGROUND OF THE INVENTION

1. Field of the Invention

The invention relates in general to a display device, and more particularly to a touch display device inhibiting electrostatic discharge.

2. Description of the Related Art

Touch panels have been widely applied to consumer electronics, such as communication handsets, notebooks, PDAs, digital cameras, etc.

For a touch panel that is operated through a finger or touch pen, a problem of electrostatic interference or external noise would probably arise so that operating signals of other internal electronic components of the product would be influenced directly or indirectly. For example, in a liquid crystal display device having a touch panel, electrostatic discharge would get into the liquid crystal panel through a common electrode (Vcom) of the liquid crystal display device. That would damage a driving IC of the display device at worst and thus degrade the display quality. In addition, noise influencing the touch panel would be easily generated due to the common electrode of the liquid crystal display device driven by an alternating current. Thus, the touch panel would have false actions and a user cannot operate the device accurately.

BRIEF SUMMARY OF THE INVENTION

Embodiments of the present invention may provide a touch display device including a display device, a touch panel, and a transparent shielding layer. The touch panel is disposed on the display device. The touch panel includes a substrate and a touch sensor. The touch sensor is disposed on the substrate. The transparent shielding layer is disposed between the display device and the touch sensor. The transparent shielding layer includes an edge region and a central region. An impedance of the edge region is less than or equal to an impedance of the central region.

In embodiments of the present invention, the touch display device may further include a low-impedance layer disposed in the edge region of the transparent shielding layer and grounded to the transparent shielding layer.

The above and other aspects of the invention will become better understood with regard to the following detailed description of the preferred but non-limiting embodiment(s). The following description is made with reference to the accompanying drawings.

DETAILED DESCRIPTION OF THE INVENTION

In the present embodiment, a touch display device inhibiting electrostatic discharge is provided. The touch display device includes a touch panel and a display device parallel to each other. A transparent shielding layer is disposed between the touch panel and the display device, and a low-impedance layer is disposed at an edge region of the transparent shielding layer. The transparent shielding layer and the low-impedance layer are grounded in common so as to inhibit the noise and the electrostatic discharge.

Figure 1:
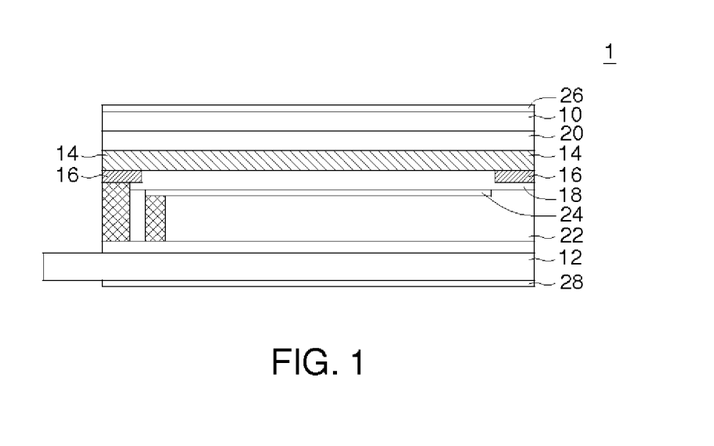
FIG. 1 shows a touch display device inhibiting electrostatic discharge according the embodiment of the present invention.

FIG. 1 shows a touch display device inhibiting electrostatic discharge according the embodiment of the present invention. Referring to FIG. 1, the touch display device 1 includes a touch panel 10, an active array substrate 12, a transparent shielding layer 14 and a low-impedance layer 16. The active array substrate 12 is disposed parallel to the touch panel 10. In this embodiment, the active array substrate 12 is a thin film transistor array substrate, and the touch panel 10 is a capacitive touch panel with a substrate and a touch sensor disposed thereon. The detailed structure will be described as the following.

The transparent shielding layer 14 is disposed between the active array substrate 12 and the touch panel 10. The transparent shielding layer 14 can be made of the same material as that of a sensing electrode (not shown in FIG. 1) of the touch panel 10, for example, ITO or other transparent conductive materials such as CTO, AZO, IZO, ZnO, SnO or a combination thereof. The transparent shielding layer 14 and the low-impedance layer 16 are grounded in common. The low-impedance layer 16 is disposed at an edge region of the transparent shielding layer, and between the transparent shielding layer 14 and the active array substrate 12. The low-impedance layer 16 may be made of metal to form a metal ring surrounding the transparent shielding layer 14.

If only the ITO transparent shielding layer 14 is disposed, it would lead to a reduced shielding effect due to its high impedance. However, in the embodiment, the metallic low-impedance layer 16 disposed at the edge region of the transparent shielding layer 14 is common grounded with the transparent shielding layer 14 to improve the shielding effect. In other embodiments, the same effect can be achieved by using a transparent shielding layer 14 having an edge region with lower impedance and a central region with higher impedance.

The touch display device 1 further includes a planar layer 18 covering the transparent shielding layer 14 and the low-impedance layer 16 to provide a disposition surface for other layers.

The touch display device 1 can be a monochrome liquid crystal display or a color liquid crystal display. Preferably, the touch display device 1 further includes a color filter layer 20 and a liquid crystal layer 22. The color filter layer 20 can be disposed between the touch panel 10 and the active array substrate 12. The liquid crystal layer 22 may be disposed between the active array substrate 12 and the color filter layer 20. In the present embodiment, the color filter layer 20 is disposed between the touch panel 10 and the transparent shielding layer 14, and the liquid crystal layer 22 is disposed between the planar layer 18 and the active array substrate 12.

In addition, the color filter layer 20 is directly integrated with the touch panel 10 for reducing a whole thickness of the structure.

The touch display device 1 further includes a common electrode 24 disposed under the planar layer 18 and connected to the active array substrate 12. The transparent shielding layer 14 and the low-impedance layer 16 are disposed above the common electrode 24 to prevent electrostatic discharge generated on the touch panel 10 and external noise from entering the active array substrate 12 through the common electrode 24. Therefore, electrical signals in a driving IC (not shown) or the active array substrate 12 would not be interfered by the electrostatic discharge or external noise. In addition, the touch display device 1 further includes two polarizing sheets 26 and 28. The polarizing sheet 26 is adhered to a top surface of the touch panel 10, and the polarizing sheet 28 is adhered to a bottom surface of the active array substrate 12.

Figure 2:
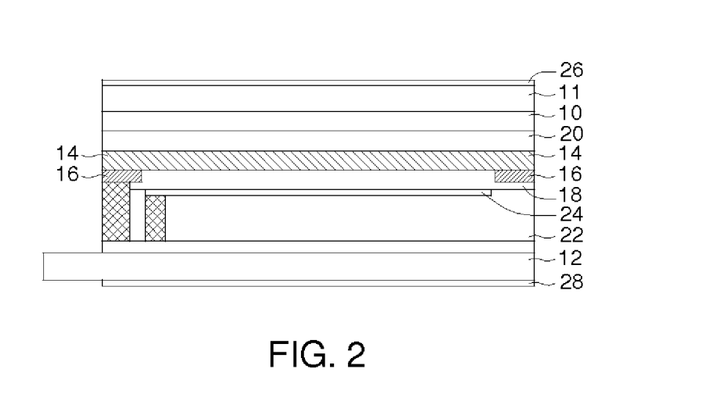
FIG. 2 shows a touch display device in FIG. 1 that further includes a transparent cover plate.

FIG. 2 shows a touch display device of FIG. 1 further including a transparent cover plate. As shown in FIG. 2, the transparent cover plate 11 is disposed between the polarizing sheet 26 and the color filter layer 20. The transparent cover plate 11 is made of, for example, a material with high strength, scratch resistant and transmittance, such as glass, polyacrylate, engineering plastic, etc.

Figure 3:
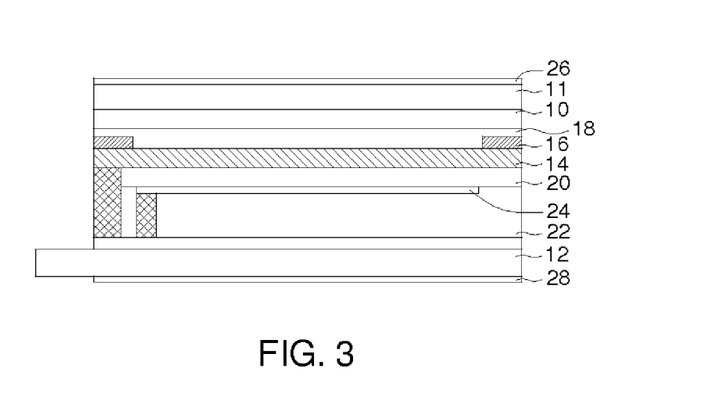
FIG. 3 shows a variation of the touch display device in FIG. 2.

The structure shown in FIG. 2 may be varied based on demand for device arrangement and manufacturing process. FIG. 3 shows a variation of the touch display device of FIG. 2. As shown in FIG. 3, the planar layer 18 is disposed under a bottom surface of the touch panel 10. The low-impedance layer 16 and the transparent shielding layer 14 are disposed under a bottom surface of the planar layer 18. The color filter layer 20 and the common electrode 24 are sequentially disposed under a bottom surface of the transparent shielding layer 14. In this embodiment, the arrangement of the liquid crystal layer 22, the active array substrate 12 and the polarizing sheet 28 are the same as that in FIG. 2. The transparent shielding layer 14 and the low-impedance layer 16 are still disposed between the common electrode 24 and the touch sensor of the touch panel 10 to inhibit the noise and the electrostatic discharge.

The touch panel 10 of the present embodiment will be described in detail with regard to the following description. The touch panel 10 of the present embodiment may have a single substrate or two substrates. The following description is made with reference to the accompanying drawings.

Figure 4:
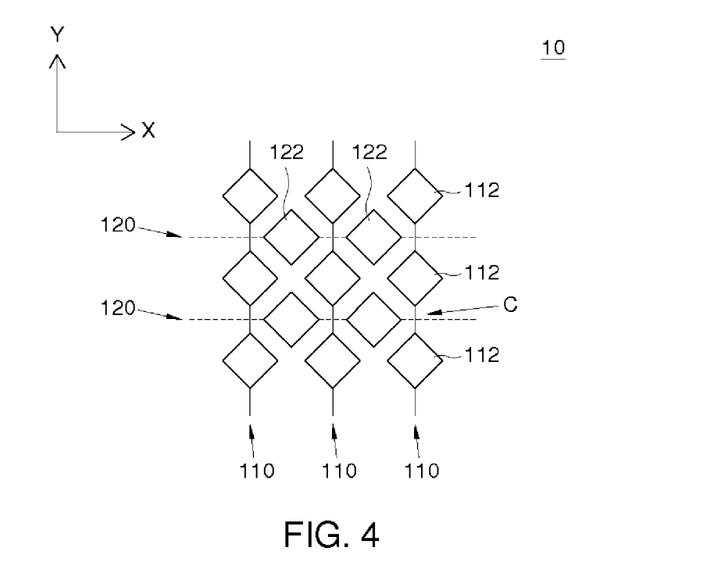
FIG. 4 shows the touch sensor of the touch panel.

FIG. 4 shows the touch sensor of the touch panel. The touch sensor includes a plurality of first sensing electrodes 110 and a plurality second sensing electrodes 120. The first sensing electrodes 110 are parallel to each other and evenly spaced. In addition, the first sensing electrodes 110 are extended along a first direction, such as a Y direction in FIG. 4. The second sensing electrodes 120 are parallel to each other and evenly spaced. In addition, the second sensing electrodes 120 are extended along a second direction perpendicular to the first direction, such as an X direction in FIG. 4. Each of the first sensing electrodes 110 includes a plurality of first electrode regions 112. Each of the second sensing electrodes 120 includes a plurality of second electrode regions 122. The first electrode region 112 and the second electrode region 122 may have any shape such as square, rectangle, rhombus, triangle, polygon, circle, ellipsoid, etc. In this embodiment, the electrode region has a rhombus shape.

As shown in FIG. 4, the first electrode regions 112 and the second electrode regions 122 are arranged in stagger so as to define X and Y coordinates of the positions. As the first sensing electrodes 110 and the second sensing electrodes 120 are disposed on the single substrate, as shown in FIG. 1 and FIG. 3, an insulating material may be disposed at a intersection point C of the first sensing electrode 110 and the second sensing electrode 120 to prevent short circuit between the first sensing electrode 110 and the second sensing electrode 120. In another embodiment shown in FIG. 2, the first sensing electrode 110 and the second sensing electrode 120 are disposed on two substrates respectively. This kind of design does not concern short circuit at the intersection point C. Various structures of the touch panel 10 will be described in the following description.

Figure 5A:
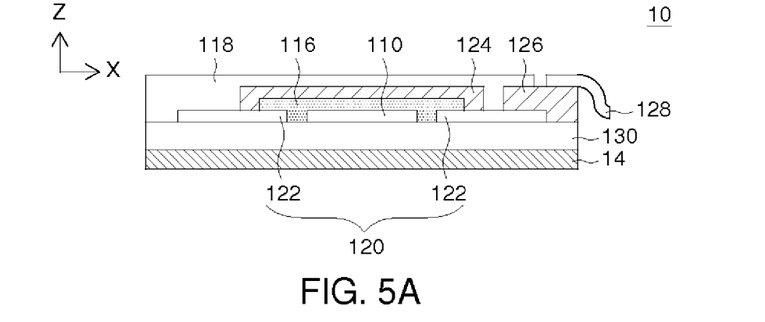
FIG. 5A, FIG. 5B, FIG. 5C, FIG. 6A, and FIG. 6B show the different embodiments of the touch panel with single substrate.

Various structures of the touch panel 10 at the intersection point C in FIG. 4 are described in the following description. FIG. 5A shows a touch panel having a single substrate of the first kind. The first sensing electrode 110 and the second sensing electrode 120 are disposed on the same substrates 130. As shown in FIG. 5A, the first sensing electrode 110 is covered by an insulating layer 116. The second electrode regions 122 adjacent to opposite sides of the first sensing electrode 110 are connected to each other by a conducting wire 124 on the insulating layer 116. The second electrode regions 122 and the conducting wire 124 form a bridge island structure. Therefore, all of the second electrode regions 122 of the second sensing electrodes 120 are connected to each other, and short circuit problem is prevented by the insulating layer 116.

Moreover, the second electrode region 122 may be connected to an external circuit board, such as a flexible printed circuit (FPC) 128, by a conducting wire 126. The conducting wires 124, 126 are a metal or a transparent conducting material, such as ITO. The first sensing electrode 110, the second sensing electrode 120 and the conducting wires 124, 126 are covered by a protecting layer 118. The transparent shielding layer 14 that provides protecting function of electrostatic discharge is disposed under the bottom surface of the substrate 130 far away from the first sensing electrode 110 and the second sensing electrode 120. The color filter layer 20 shown in FIG. 1 is disposed between the substrate 130 and the transparent shielding layer 14, or integrally formed on the substrate 130. The low-impedance layer 16, the planar layer 18, the common electrode 24, the liquid crystal layer 22 and the active array substrate 12 and so on are disposed under the transparent shielding layer 14.

Figure 5B:
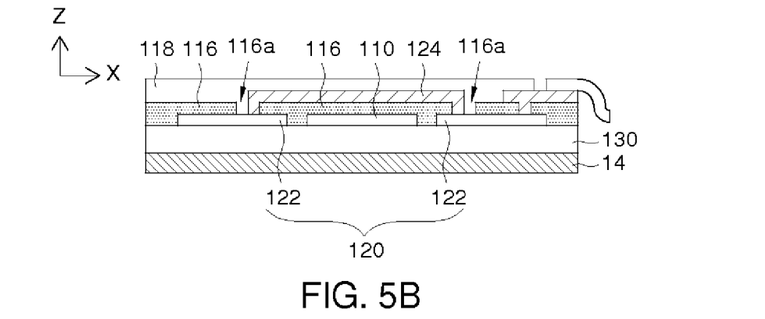
Figure 5C:
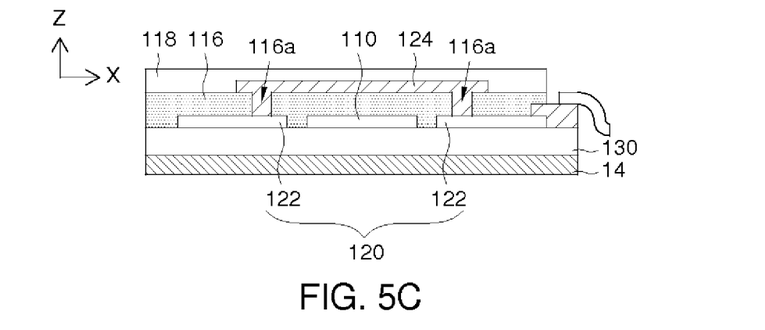

FIGS. 5B and 5C show touch panels having a single substrate of the second kind and the third kind, respectively. The first sensing electrode 110 and the second sensing electrode 120 are covered by the insulating layer 116 having a plurality of contact holes 116a. A part of a surface of the second electrode region 122 is exposed by the contact hole 116a. The conducting wire 124 is extended into the contact hole 116a and connected to the second electrode region 122. The contact hole 116a is partially filled with the conducting wire 124, as shown in FIG. 5B, or is wholly filled with the conducting wire 124, as shown in FIG. 5C. The first sensing electrode 110, the second sensing electrode 120, the conducting wire 124 and so on are covered by the protecting layer 118.

Figure 6A:
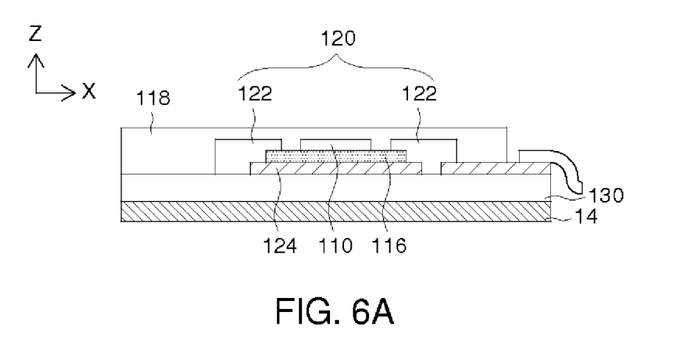
Figure 6B:
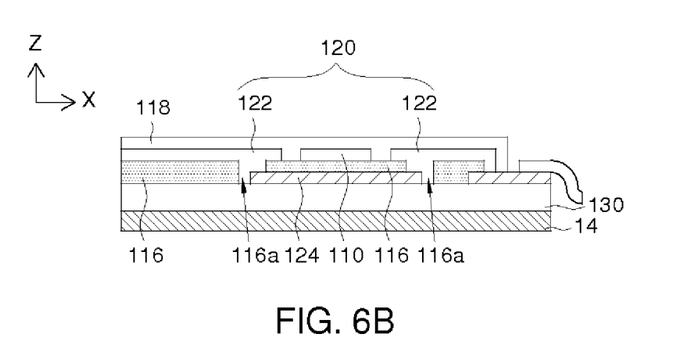

FIG. 6A and FIG. 6B show touch panels having a single substrate of the forth kind and the fifth kind, respectively. As shown in FIG. 6A, the conducting wire 124 is directly disposed on the substrate 130. In addition, a part of the conducting wire 124 is covered by the insulating layer 116. The first sensing electrode 110 is disposed on the insulating layer 116 thereby being separated from the conducting wire 124. A part of the insulating layer 116 is covered by the second sensing electrode 120. The second electrode region 122 of the second sensing electrode 120 is connected to a part of the conducting wire 124 not covered by the insulating layer 116. Therefore, all of the second electrode regions 122 of the second sensing electrodes 120 are connected to each other. The first sensing electrode 110, the second sensing electrode 120, etc., are covered by the protecting layer 118.

As shown in FIG. 6B, the conducting wire 124 and the substrate 130 are covered by the insulating layer 116 with the contact hole 116*a*. A part of a surface of the conducting wire 124 is exposed by the contact hole 116*a*. The second electrode regions 122 adjacent to opposite sides of the first sensing electrode 110 are extended into the contact hole 116*a* and connected to the conducting wire 124. Therefore, all of the second electrode regions 122 of the second sensing electrodes 120 are connected to each other.

Figure 7A:
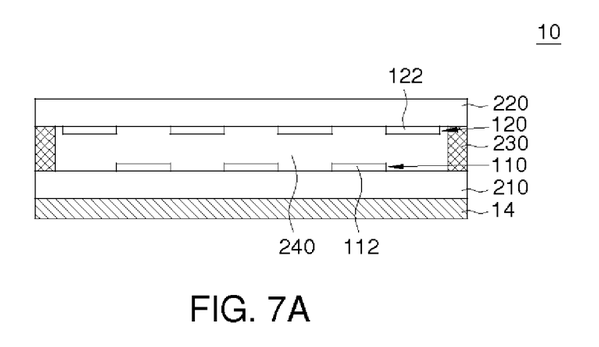
FIG. 7A and FIG. 7B show the different embodiments of the touch panels with two substrates.
Figure 7B:
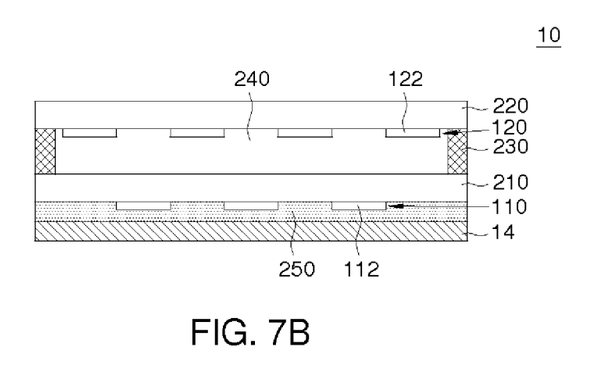

A touch panel 10 having two substrates is described as the following. FIG. 7A and FIG. 7B show touch panels having two substrates of the first kind and the second kind, respectively. The touch panel 10 has a first substrate 210 and a second substrate 220 parallel to each other. The first sensing electrode 110 is disposed on the first substrate 210. The second sensing electrode 120 is disposed on the second substrate 220. As shown in FIG. 7A, the first sensing electrode 110 and the second sensing electrode 120 face to opposite directions whereby the first sensing electrode 110 faces the second sensing electrode 120. The transparent shielding layer 14 is disposed adjacent to an external surface of the first substrate 210 (or the second substrate 220). The touch panel 10 further includes a spacer 230 for separating the first substrate 210 and the second substrate 220 in a distance. The first substrate 210 and the second substrate 220 may be adhered to each other by coating an optical adhesive 240 between the first substrate 210 and the second substrate 220.

As shown in FIG. 7B, the first sensing electrode 110 and the second sensing electrode 120 are disposed facing to the same direction wherein the first sensing electrode 110 is disposed under a bottom surface of the first substrate 210, and the second sensing electrode 120 is disposed under a bottom surface of the second substrate 220. In addition, the first sensing electrode 110 is covered and protected by the whole insulating layer 250. The transparent shielding layer 14 and the first sensing electrode 110 may be disposed on the same side of the first substrate 210, and separated from each other by the insulating layer 250.

The touch panel 10 illustrated in FIGS. 5A-7B can be applied to the touch display device 1 of FIG. 1, or other touch electronic devices that be operated by touching, such as communication handsets, personal digital assistants, navigation apparatus, etc., for solving electrostatic discharge problems. In particular, the common grounded transparent shielding layer and the low-impedance layer disposed in the touch display device can inhibit the noise and the electrostatic discharge. Therefore, a false action due to interference of an electrical signal in the touch panel and the display device can be avoided.

While the invention has been described by way of example and in terms of preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch panel, comprising:
    a substrate;
    a plurality of first electrodes disposed on the substrate along a first direction;
    a plurality of second electrodes disposed on the substrate along a second direction, the second electrodes and the first electrodes being oriented to cross over each other at crossover locations, wherein each of the second electrode comprises:
        a plurality of second electrode regions; and
        a plurality of second conducting wires, each of the second conducting wires being connected between two adjacent second electrode regions; and
    a plurality of insulators separate from each other and disposed in the crossover locations to separate the first electrodes and the second electrodes at the crossover locations, wherein at least one of the second electrode regions covers a part of one of the insulators.

2. The touch panel according to claim 1, further comprising a plurality of wires connected with the second electrodes for connecting the second electrodes to an external circuit board.

3. The touch panel according to claim 2, wherein at least a part of each wire connected with the external circuit board is made of metal material.

4. The touch panel according to claim 2, wherein at least a part of each wire connected with the external circuit board is made of transparent conducting material.

5. The touch panel according to claim 2, further comprising:
    a protecting layer disposed on the substrate and covering at least in part the first electrodes, the second electrodes, the insulators and the wires.

6. The touch panel according to claim 5, wherein the protecting layer comprises an opening to expose a part of each wire connected with the external circuit board.

7. The touch panel according to claim 5, further comprising a substrate disposed on the protecting layer.

8. The touch panel according to claim 7, wherein the substrate is a color filter substrate.

9. The touch panel according to claim 2, wherein the external circuit board is a flexible printed circuit.

10. The touch panel according to claim 1, wherein the substrate is a transparent cover plate.

11. The touch panel according to claim 10, wherein the substrate is made of strengthened glass or engineering plastic.

12. The touch panel according to claim 10, further comprising a planar layer disposed on the first electrodes and the second electrodes, and a transparent shielding layer disposed on the planar layer and insulated from the first electrodes and the second electrodes.

13. The touch panel according to claim 12, wherein the transparent shielding layer has an edge region with lower impedance and a central region with higher impedance.

14. The touch panel according to claim 12, further comprising a low-impedance layer disposed in the edge region of the transparent shielding layer and grounded with the transparent shielding layer in common.

15. The touch panel according to claim 1, further comprising a transparent shielding layer disposed on a side of the substrate facing away from the first electrodes, the second electrodes, and the insulators.

16. The touch panel according to claim 15, wherein the transparent shielding layer has an edge region with lower impedance and a central region with higher impedance.

17. The touch panel according to claim 15, further comprising a low-impedance layer disposed in the edge region of the transparent shielding layer and grounded with the transparent shielding layer in common.

18. The touch panel according to claim 1, wherein the second conducting wires are made of transparent conducting material.

19. The touch panel according to claim 1, wherein the second conducting wires are made of metal material.

20. The touch panel according to claim 1, wherein a lateral side of at least one of the insulators is not aligned with a lateral side of one of the second conducting wire under the insulator to expose a part of the second conducting wire, and one of the second electrode regions covers the exposed part of the second conducting wire along the second direction and touches the lateral side of the insulator, the lateral side of the second conducting wire and the exposed part of the second conducting wire.

21. The touch panel according to claim 1, wherein a length of one of the insulators along the second direction is shorter than a length of one of the second conducting wires under the insulator to expose a part of the second conducting wire, and the second electrode region covers and in direct contact with the entire exposed part of the second conducting wire.

22. The touch panel according to claim 1, wherein a length of each of the first electrode regions at the crossover location along the second direction is shorter than a length of each of the insulators along the second direction.

23. The touch panel according to claim 1, wherein at least one of the second electrode regions has at least one step portion, and the step portion touches at least one of the second conducting wires and at least one of the insulators.

24. The touch panel according to claim 1, wherein the first electrodes and the second electrodes are made of transparent conducting material.

25. A touch display device, comprising:
a display device, comprising:
an active array substrate;
a color filter substrate disposed parallel to the active array substrate; and
a color filter layer disposed on the color filter substrate and corresponding to the active array substrate; and
a touch sensor disposed on the color filter substrate facing away from the color filter layer, and comprising:
a plurality of first electrodes arranged along a first direction;
a plurality of second electrodes arranged along a second direction, the second electrodes and the first electrodes being oriented to cross over each other at crossover locations, wherein each of the second electrode comprises:
a plurality of second electrode regions; and
a plurality of second conducting wires, each of the second conducting wires being connected between two adjacent second electrode regions; and
a plurality of insulators separate from each other and disposed in the crossover locations to separate the first electrodes and the second electrodes at the crossover locations, wherein at least one of the second electrode regions covers a part of one of the insulators.

26. The touch display device according to claim 25, further comprising a plurality of wires connected with the second electrodes for connecting the second electrodes to an external circuit board.

27. The touch display device according to claim 26, wherein at least a part of each wire connected with the external circuit board is made of metal material.

28. The touch display device according to claim 26, wherein at least a part of each wire connected with the external circuit board is made of transparent conducting material.

29. The touch display device according to claim 26, further comprising:
a protecting layer disposed on the substrate and covering at least in part the first electrodes, the second electrodes, the insulators and the wires.

30. The touch display device according to claim 29, wherein the protecting layer comprises an opening to expose a part of each wire connected with the external circuit board.

31. The touch display device according to claim 26, wherein the external circuit board is a flexible printed circuit.

32. The touch display device according to claim 25, wherein the second conducting wires are made of transparent conducting material.

33. The touch display device according to claim 25, wherein the second conducting wires are made of metal material.

34. The touch panel according to claim 25, wherein a lateral side of at least one of the insulators is not aligned with a lateral side of one of the second conducting wire under the insulator to expose a part of the second conducting wire, and one of the second electrode regions covers the exposed part of the second conducting wire along the second direction and touches the lateral side of the insulator, the lateral side of the second conducting wire and the exposed part of the second conducting wire.

35. The touch panel according to claim 25, wherein a length of one of the insulators along the second direction is shorter than a length of one of the second conducting wires under the insulator to expose a part of the second conducting wire, and the second electrode region covers and in direct contact with the entire exposed part of the second conducting wire.

36. The touch panel according to claim 25, wherein a length of each of the first electrode regions at the crossover location along the second direction is shorter than a length of each of the insulators along the second direction.

37. The touch panel according to claim 25, wherein at least one of the second electrode regions has at least one step portion, and the step portion touches at least one of the second conducting wires and at least one of the insulators.

38. The touch display device according to claim 25, wherein the first electrodes and the second electrodes are made of transparent conducting material.

39. A touch display device, comprising:
a display device, comprising:
an active array substrate;
a color filter substrate disposed parallel to the active array substrate; and
a color filter layer disposed on the color filter substrate and corresponding to the active array substrate; and
a touch sensor disposed on the color filter substrate and between the color filter layer and the color filter substrate, and comprising:
a plurality of first electrodes arranged along a first direction;
a plurality of second electrodes arranged along a second direction, the second electrodes and the first electrodes being oriented to cross over each other at crossover locations, wherein each of the second electrode comprises:
a plurality of second electrode regions; and
a plurality of second conducting wires, each of the second conducting wires being connected between two adjacent second electrode regions; and
a plurality of insulators isolated from each other and disposed in the crossover locations to separate the first electrodes and the second electrodes at the crossover locations, wherein at least one of the second electrode regions covers a part of one of the insulators.

40. The touch display device according to claim 39, further comprising a plurality of wires connected with the second electrodes for connecting the second electrodes to an external circuit board.

41. The touch display device according to claim 40, wherein at least a part of each wire connected with the external circuit board is made of metal material.

42. The touch display device according to claim 40, wherein at least a part of each wire connected with the external circuit board is made of transparent conducting material.

43. The touch display device according to claim 40, further comprising: a protecting layer disposed on the substrate and covering at least in part the first electrodes, the second electrodes, the insulators and the wires.

44. The touch display device according to claim 43, wherein the protecting layer comprises an opening to expose a part of each wire connected with the external circuit board.

45. The touch display device according to claim 40, wherein the external circuit board is a flexible printed circuit.

46. The touch display device according to claim 39, wherein the second conducting wires are made of transparent conducting material.

47. The touch display device according to claim 39, wherein the second conducting wires are made of metal material.

48. The touch panel according to claim 39, wherein a lateral side of at least one of the insulators is not aligned with a lateral side of one of the second conducting wire under the insulator to expose a part of the second conducting wire, and one of the second electrode regions covers the exposed part of the second conducting wire and touches the lateral side of the insulator, the lateral side of the second conducting wire and the exposed part of the second conducting wire.

49. The touch panel according to claim 39, wherein a length of one of the insulators along the second direction is shorter than a length of one of the second conducting wires under the insulator to expose a part of the second conducting wire, and the second electrode region covers and in direct contact with the entire exposed part of the second conducting wire.

50. The touch panel according to claim 39, wherein a length of each of the first electrode regions at the crossover location along the second direction is shorter than a length of each of the insulators along the second direction.

51. The touch panel according to claim 39, wherein at least one of the second electrode regions has at least one step portion, and the step portion touches at least one of the second conducting wires and at least one of the insulators.

* * * * *